UNITED STATES PATENT OFFICE.

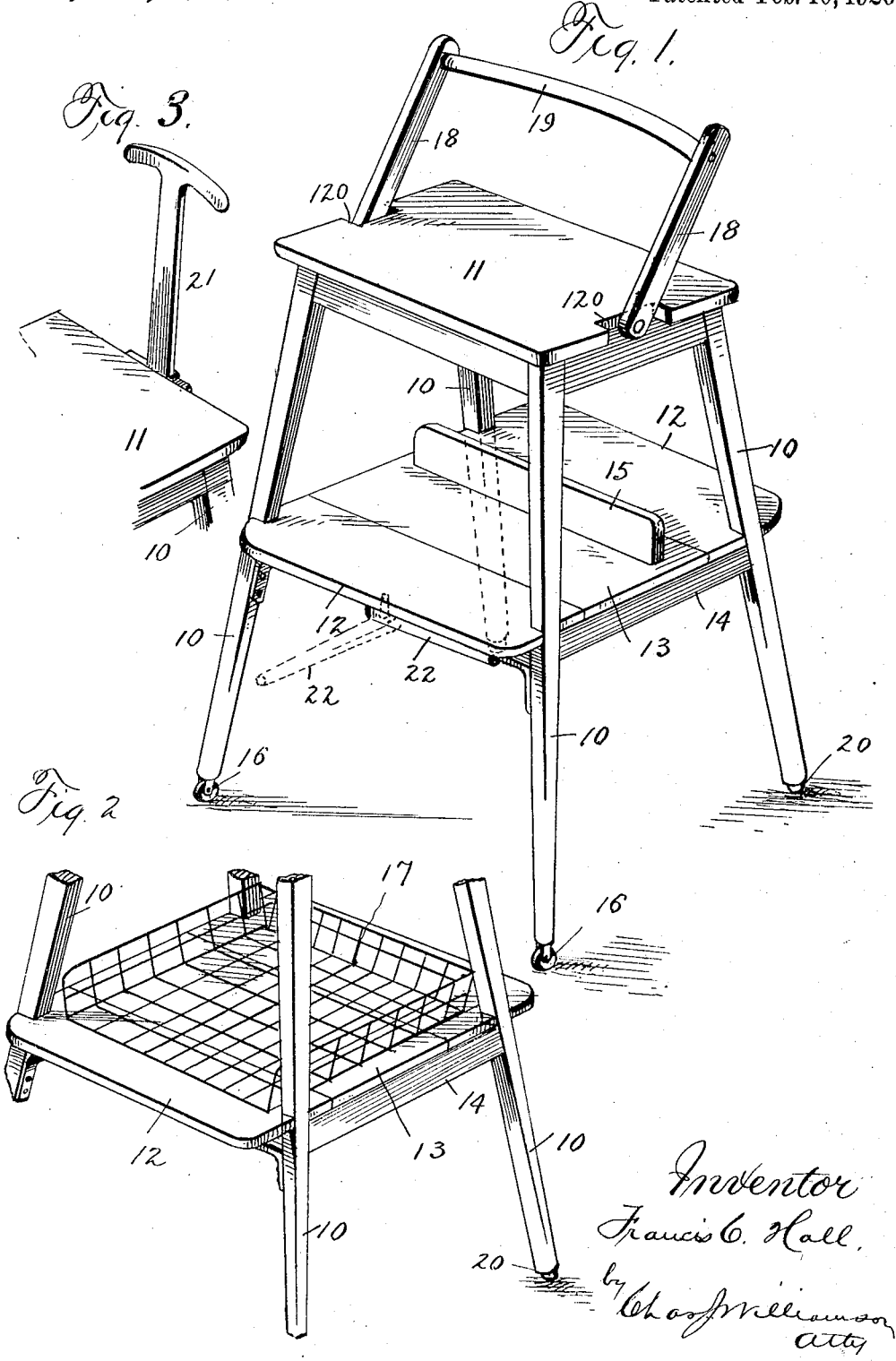

FRANCIS C. HALL, OF WASHINGTON, DISTRICT OF COLUMBIA.

COMBINATION ARTICLE OF FURNITURE.

1,330,373.  Specification of Letters Patent.  Patented Feb. 10, 1920.

Application filed April 17, 1919. Serial No. 290,809.

*To all whom it may concern:*

Be it known that I, FRANCIS C. HALL, of Washington, District of Columbia, have invented certain new and useful Improvements in Combination Articles of Furniture, and do hereby declare that the following is a full, clear, and exact description thereof.

My invention relates to articles of furniture which are so constructed that one article serves in place of several. In making my invention, I have had in view the special requirements of libraries, which, because of the limited space of alcoves, and for other reasons, make impossible an adequate equipment composed of individual articles, each suited for one purpose, and not only renders desirable the serving of a variety of purpose by one article, but that it shall be done with the minimum of inconvenience and discomfort. With this in view, my invention consists in the article of furniture constructed substantially as hereinafter specified and claimed.

In the drawings:—

Figure 1 is a perspective view of an article of furniture embodying my invention;

Fig. 2 is a similar view, of the lower portion, when arranged to receive a file or basket.

Fig. 3 is a like view, illustrating a stationary handle and back rest.

The structure shown in the drawings, comprises four equi-distant legs 10 that converge toward the top, where they are joined to, and support an oblong board 11 of a size to fit it for use as a seat, and at or substantially at mid-height of the legs, I secure thereto two similar strip-like pieces 12, which lie in the same horizontal plane, and opposite one another, each of a size to serve either as a step or a seat, and for the last named purpose, in particular, being extended forward from the pair of legs between which it is situated. The inner edges of the two pieces 12 are spaced apart, and between them I place an oblong board 13 of a length to reach between and rest upon the pair of horizontal braces 14 which connect the legs in pairs, and loosely filling the space between the step pieces 12. On one side the board 13 has a rib or cleat 15 and the board is invertible so that either its plain or its ribbed side may be placed uppermost. When it is placed with the rib uppermost, books may be piled on the shelf which the adjacent board and step surfaces afford, and if books are placed only at one side of the rib, then the article can be tilted to rest upon the extremities of two of the legs, (which are preferably provided with casters 16) and thus used as a truck to move the books about, as from a library table to alcoves. The article being tilted so that the rib 15 is lowermost, the rib will prevent the books sliding off the shelf. The rib is preferably placed eccentrically of the board 13 to give a large area for books of large size.

By inverting the board 13 to place the rib lowermost, an extended, flat, supporting surface is provided on which may be readily placed a file or basket 17, (as shown in Fig. 2) for papers or correspondence.

By the provision of the two, opposite step pieces 12, the structure may be used as a step ladder from either side, without the necessity of turning it about, which might be difficult, or impossible in the contracted space of library alcoves, and which, if it could be done, would require physical effort, especially if at the time books happened to be on the device.

For convenient handling, I provide a handle which also serves as a back-rest, when one is seated on the top 11. Said handle may be stationary, but I prefer to hinge it so that it may swing to an inclined position in either direction both to provide ample space for seating, on either side, and to give a desirable angle to the back support. As shown, the combined handle and back consists of two side bars 18 pivoted at their lower ends at the sides of the top 11, and connected at or near their upper ends by a curved cross bar 19, which affords the hand grip and also the back-engaging member. A notch 120 in each side of the top provides shoulders to limit the swing of the side bars 18. When the article is picked up by the handle, the latter automatically swings to mid-position.

Upon the ends of the two legs 10 which do not have the rollers, I place rubber tips 20.

In Fig. 3, I show a stationary handle 21, it being in the form of an upright stem with a cross piece at the top of a size and form permitting the hand to comfortably grasp it, and yet able to support the back of one sitting on the top.

The handle, in either form, is useful to balance one in climbing the article as a step-ladder.

To support the article tilted at an angle to facilitate loading books on the shelf, I provide a leg 22 pivoted to one of the step pieces that may be turned from a position under the step to the one at right angles shown in dotted lines, to rest against the floor.

I claim:—

1. An article of furniture comprising legs, a top, and a combined handle and back rest, associated with the top, said handle and back rest being pivoted and two opposite step-forming pieces supported by the legs below the top, parallel with the handle, whereby one may sit on the top with his feet on the step of either side, and rest his back against the handle.

2. An article of furniture comprising legs, a top, and two, opposite step-forming pieces supported by the legs below the top, and spaced apart, and a loose board supported between said pieces and forming therewith a continuous horizontal surface.

3. An article of furniture comprising legs, a top, and two, opposite step-forming pieces supported by the legs below the top, and spaced apart, and a loose invertible board supported between said pieces, and having a rib on one side parallel with the step-forming pieces, and a substantial distance from each piece.

In testimony that I claim the foregoing, I have hereunto set my hand,

FRANCIS C. HALL.